(12) United States Patent
Takayama et al.

(10) Patent No.: US 9,177,578 B1
(45) Date of Patent: Nov. 3, 2015

(54) HARD DISK DRIVE VOICE COIL ACTUATOR LATCH

(71) Applicant: HGST Netherlands B.V., Amsterdam (NL)

(72) Inventors: Akinori Takayama, Yokohama (JP); Hiromitsu Masuda, Odawara (JP); Shinichi Kimura, Fujisawa (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/622,804

(22) Filed: Feb. 13, 2015

(51) Int. Cl.
G11B 5/54 (2006.01)

(52) U.S. Cl.
CPC .................................. *G11B 5/54* (2013.01)

(58) Field of Classification Search
CPC ........... G11B 5/54; G11B 21/22; G11B 21/12
USPC ........................................... 360/256.2, 256.3
See application file for complete search history.

(56) References Cited

U.S. PATENT DOCUMENTS

| | | | |
|---|---|---|---|
| 5,145,038 A * | 9/1992 | Kuwahara | 188/158 |
| 5,483,399 A | 1/1996 | Jeong et al. | |
| 5,568,333 A | 10/1996 | Bang | |
| 5,734,527 A | 3/1998 | Reinhart | |
| 6,462,913 B1 | 10/2002 | Chew | |
| 6,717,774 B2 | 4/2004 | Hanada et al. | |
| 7,203,034 B2 | 4/2007 | Ohta et al. | |
| 7,286,327 B2 | 10/2007 | Jeong | |
| 7,606,004 B2 | 10/2009 | Tsuda et al. | |
| 7,633,702 B1 | 12/2009 | Heimbaugh | |
| 8,081,401 B1 * | 12/2011 | Huang et al. | 360/256.2 |
| 8,111,484 B2 | 2/2012 | Kim et al. | |
| 8,760,816 B1 | 6/2014 | Myers et al. | |
| 2001/0024339 A1 | 9/2001 | Yaegashi | |

FOREIGN PATENT DOCUMENTS

CN 101114459 B 5/2011

OTHER PUBLICATIONS

"Inertia magnetic latch design considering actuator load unload", Microsystem Technologies, Jan. 30, 2009, pp. 703-712, May 2009, vol. 15, Issue 5, Springer Link, downloaded from: http://link.springer.com/article/10.1007%2Fs00542-008-0771-4#page-1 on Sep. 23, 2014.
"Active magnetic inertia latch for hard disk drives", Microsystem Technologies, Nov. 21, 2010, pp. 127-132, Jan. 2011, vol. 17, Issue 1, Springer Link, downloaded from: http://link.springer.com/article/10.1007%2Fs00542-010-1168-8 on Sep. 23, 2014.

* cited by examiner

Primary Examiner — Angel Castro
(74) Attorney, Agent, or Firm — John D. Henkhaus

(57) ABSTRACT

A voice coil actuator utilizes an eddy current magnet configured for positioning proximal to the outer perimeter side face of one or more recording disk, and which cooperates with the conductive side face to generate an eddy current force to rotate a latch lever to an unlatched position. Embodiments may include an end cam on a base on which the latch lever is rotatably disposed, and the latch lever includes a cam follower capable of rotatably engaging with the end cam, whereby the magnetic attraction between the eddy current magnet and the voice coil actuator yoke generates a latch bias force which causes the end cam and cam follower to engage or mesh in order to hold the latch lever in a latched position.

15 Claims, 10 Drawing Sheets

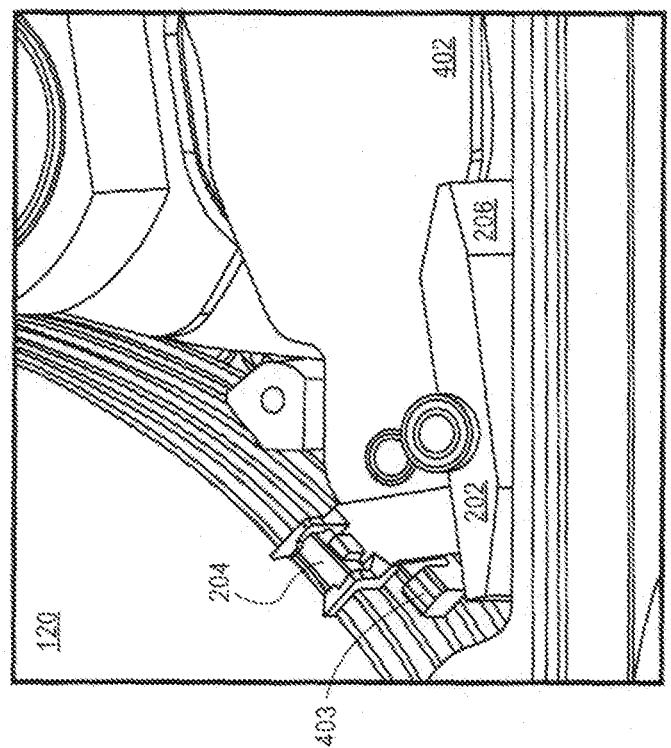
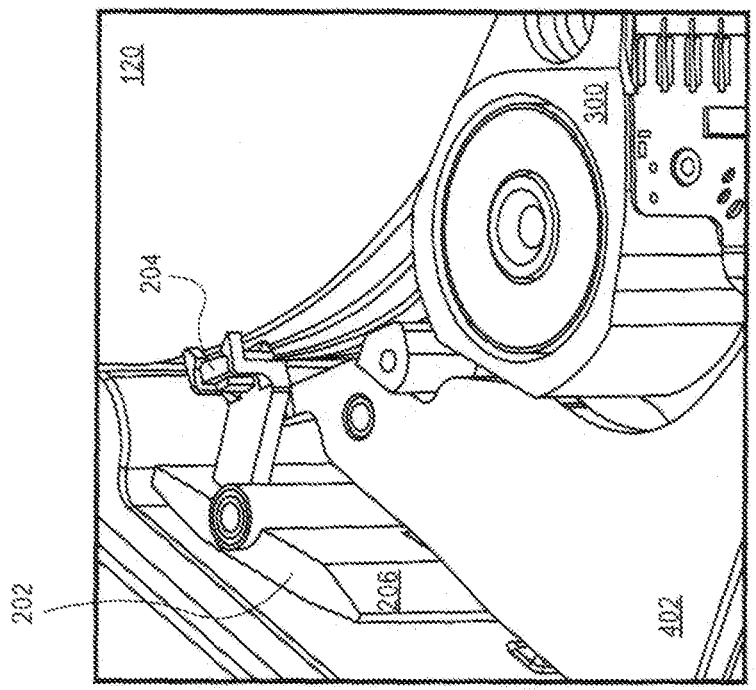
FIG. 4B
FIG. 4A

ROTATE ONE OR MORE RECORDING DISK MEDIA, CAUSING AN EDDY CURRENT MAGNET POSITIONED PROXIMAL TO THE OUTER PERIMETER SIDE FACE OF THE DISK MEDIA TO COOPERATE WITH THE SIDE FACE OF THE DISK MEDIA IN GENERATING AN EDDY CURRENT FORCE THAT ROTATES A LATCH LEVER OF A VOICE COIL ACTUATOR LATCH MECHANISM TO AN UNLATCHED POSITION
1002

STOP ROTATING THE DISK MEDIA, ALLOWING THE EDDY CURRENT MAGNET TO ATTRACT TO A MAGNETIC YOKE OF THE VOICE COIL ACTUATOR POSITIONED BELOW THE EDDY CURRENT MAGNET, TO HOLD THE LATCH LEVER IN A CLOSED POSITION BY GENERATING A LATCH BIAS FORCE WHICH CAUSES AN END CAM OF A BASE AND A CAM FOLLOWER OF THE LATCH LEVER TO ROTATABLY ENGAGE
1004

FIG. 10

HARD DISK DRIVE VOICE COIL ACTUATOR LATCH

FIELD OF EMBODIMENTS

Embodiments of the invention may relate generally to hard disk drives and more particularly to an actuator latch.

BACKGROUND

A hard-disk drive (HDD) is a non-volatile storage device that is housed in a protective enclosure and stores digitally encoded data on one or more circular disk having magnetic surfaces. When an HDD is in operation, each magnetic-recording disk is rapidly rotated by a spindle system. Data is read from and written to a magnetic-recording disk using a read/write head that is positioned over a specific location of a disk by an actuator. A read/write head uses a magnetic field to read data from and write data to the surface of a magnetic-recording disk. A write head makes use of the electricity flowing through a coil, which produces a magnetic field. Electrical pulses are sent to the write head, with different patterns of positive and negative currents. The current in the coil of the head induces a magnetic field across the gap between the head and the magnetic disk, which in turn magnetizes a small area on the recording medium.

Many HDDs are configured to include a ramp (also referred to as a load/unload ramp). Ramp load/unload technology involves a mechanism that moves the head stack assembly (HSA), including the sliders, away from and off the disks and safely positions them onto a cam-like structure. The cam typically includes a shallow ramp on the side closest to the disk. During a power-on sequence, for example, the read/write heads are loaded by moving the sliders off the ramp and over the disk surfaces when the disks reach the appropriate rotational speed. Thus, the terminology used is that the sliders or HSA are "loaded" to or over the disk (i.e., off the ramp) into an operational position, and "unloaded" from the disk (i.e., "parked" onto the ramp) such as in an idle position.

Furthermore, many HDDs are configured with a latch mechanism to secure the HSA, or at least the suspension/slider portion of the HSA, on the ramp (or perhaps on a landing zone of the disk for HDD's absent a ramp) when not operating. Thus, the head slider is prevented from dislodging from the ramp and moving over the disk when the actuator rotates due to external vibration or shock events. In light of the customer demand and industry move toward thinner and thinner HDD's, internal space constraints present challenges for sub-system design and development.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are directed toward a voice coil actuator (also referred to as a voice coil motor, or VCM) latch mechanism, a hard disk drive employing such a latch mechanism, and a method for operating a latch mechanism, where the latch mechanism utilizes an eddy current magnet configured for positioning proximal to the outer perimeter side face of one or more recording disk, and which cooperates with the conductive side face to generate an eddy current force to rotate a latch lever to an unlatched position.

Embodiments of the latch mechanism include an end cam on a base on which the latch lever is rotatably disposed, and the latch lever includes a cam follower capable of rotatably engaging with the end cam, whereby the magnetic attraction between the eddy current magnet and the voice coil actuator yoke generates a latch bias force which causes the end cam and cam follower to engage or mesh in order to hold the latch lever in a latched position.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 4A is a perspective view illustrating a latch mechanism installed in a hard disk drive (HDD), according to an embodiment;

FIG. 4B is another perspective view illustrating a latch mechanism installed in an HDD, according to an embodiment;

FIG. 10 is a flow diagram illustrating a method for operating a voice coil actuator latch system in an HDD, according to an embodiment.

DETAILED DESCRIPTION

Approaches to a voice coil actuator latch mechanism are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Operating Environments

Embodiments may be used for operating a voice coil actuator latch mechanism in a hard disk drive (HDD) storage device. Thus, in accordance with an embodiment, a plan view illustrating an HDD 100 is shown in FIG. 1 to illustrate an exemplary operating environment.

Figure 1:
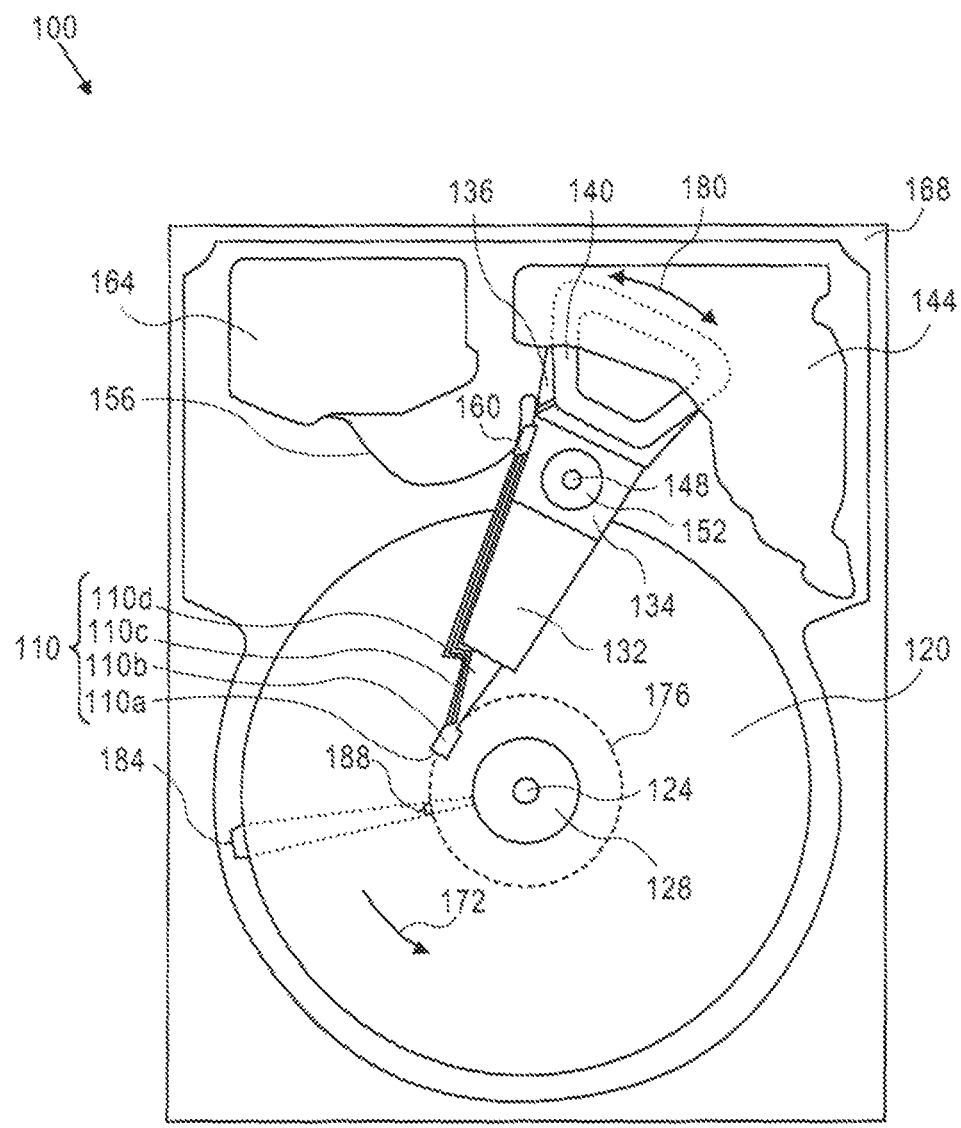
FIG. 1 is a plan view illustrating a hard disk drive, according to an embodiment.

FIG. 1 illustrates the functional arrangement of components of the HDD 100 including a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one magnetic-recording medium 120 rotatably mounted on a spindle 124 and a drive motor (not visible) attached to the spindle 124 for rotating the medium 120. The head 110a includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110, to access portions of the medium 120, being mounted on a pivot-shaft 148 with an interposed pivot-bearing assembly 152. In the case of an HDD having multiple disks, the carriage 134 is called an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a base, in conjunction with an HDD cover provides a sealed, protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector"), for example, sectored track portion 188. Each sectored track portion 188 may be composed of recorded data and a header containing a servo-burst-signal pattern, for example, an ABCD-servo-burst-signal pattern, which is information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass a data storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differs, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

INTRODUCTION

As mentioned, many HDDs are configured with a latch mechanism to secure the HSA when not in operation. When an HDD is not operating, a latch lever needs to be biased to the latched position, at which the actuator is restrained at a certain position. Latch biasing force may be generated using a magnetic attraction or repulsion force in the direction of rotation of the latch. However, due to the move to thinner HDDs and the corresponding space limitations, there may not be adequate space for means to bias the latch in this manner.

Furthermore, with latch types that rely on magnetic attraction to bias the latch, the magnet may be located above the VCM yoke, which generates the attractive force in the direction of the rotation axis and which can therefore inhibit latch lever rotation. With latch types that utilize a magnetic attraction between the magnet and a VCM yoke protrusion that is more nearly in-plane with the magnet, space for the yoke protrusion is required and the magnetic attraction force may cause friction between the latch lever and the base.

There are a number of latch types, such as magnetic, inertial, air vane, and eddy current. With eddy current latches, space for the eddy current magnet is typically required over or under the disk, which means the height of the disk drive is increased or the number of disks decreased. Based on the foregoing, one can appreciate the spatial constraints and corresponding challenges associated with designing a VCM latch mechanism for a thin HDD.

Low Profile Eddy Current Voice Coil Actuator Latch Mechanism

Figure 2:
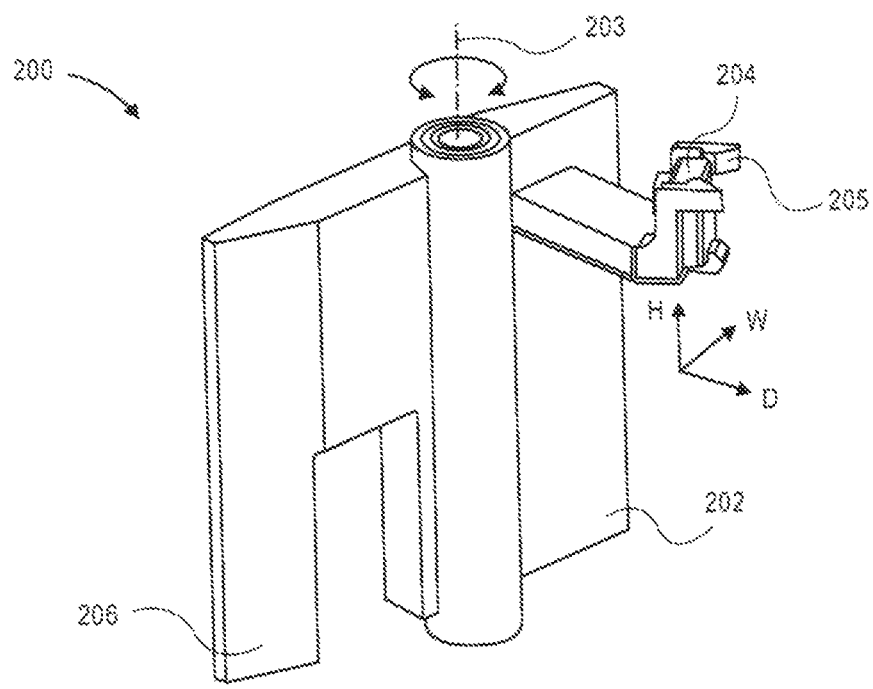
FIG. 2 is a perspective view illustrating a voice coil actuator latch mechanism, according to an embodiment.

FIG. 2 is a perspective view illustrating a voice coil actuator latch mechanism, according to an embodiment. Latch mechanism 200 comprises a latch lever 202 that is configured for rotatably mounting of latch mechanism 200 on a base, and is rotatable about rotation axis 203. Latch mechanism 200 further comprises an eddy current magnet 204 vertically mounted in a magnet support 205. The eddy current magnet 204 is mounted vertically in that its major axis is in the y-direction, which coincides with the direction of the rotation axis 203. The eddy current magnet 204 illustrated in FIG. 2 is depicted as rectangular in shape but embodiments are not so limited. Even if the eddy current magnet 204 was square-shaped, for example, its height (H) and width (W) directions would lie generally in a substantially vertical plane rather than in a horizontal plane. Thus, when eddy current magnet 204 is positioned proximal to one or more recording disk (e.g., disk 120 of FIG. 1), the eddy current magnet 204 is positioned proximal to the outer perimeter side face of the one or more disk, the importance of which is explained in more detail elsewhere herein.

Figure 3:
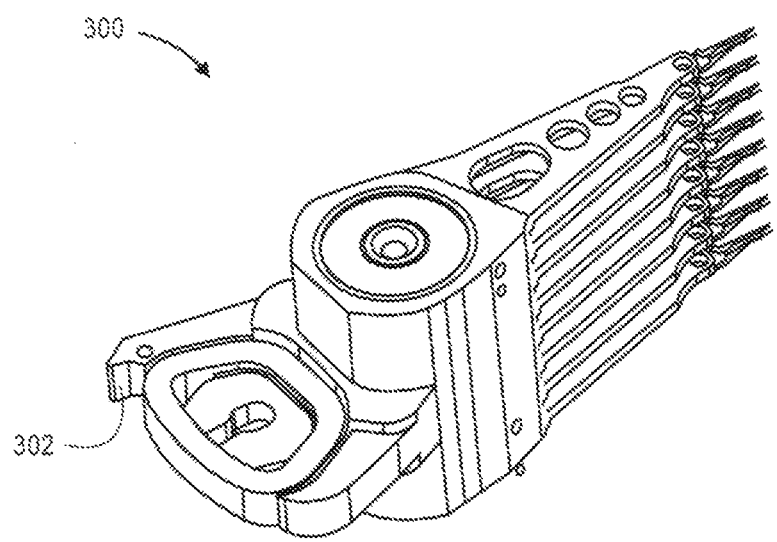
FIG. 3 is a perspective view illustrating a head stack assembly (HSA), according to an embodiment.

Latch lever 202 includes an HSA engagement portion 206 that is configured to engage with a corresponding HSA when installed in an HDD, generally at times when the HDD is not operating, i.e., when read or write operations are not being performed. FIG. 3 is a perspective view illustrating a head stack assembly (HSA), according to an embodiment. Of note, HSA 300 comprises a hook 302 that is configured to engage with a corresponding HSA engagement portion 206 (FIG. 2) of latch lever 202 (FIG. 2) of latch mechanism 200 (FIG. 2). Thus, FIGS. 2 and 3 show how the latch mechanism 200 would engage with the HSA 300 in a "latched" or closed position when installed together in an HDD, i.e., when the HSA 300 is restrained from rotating, or "secured".

FIG. 4A is a perspective view illustrating a latch mechanism installed in a hard disk drive (HDD), and FIG. 4B is another perspective view illustrating a latch mechanism installed in an HDD, both according to an embodiment. FIGS. 4A, 4B depict the positional relation between the latch mechanism 200 and one or more recording disk 120 and the HSA 300, as well as a voice coil actuator yoke 402. According to an embodiment, yoke 402 is made of magnetic material. Further, according to an embodiment, yoke 402 comprises a magnetic protrusion 403 (FIG. 4B).

Figure 5:
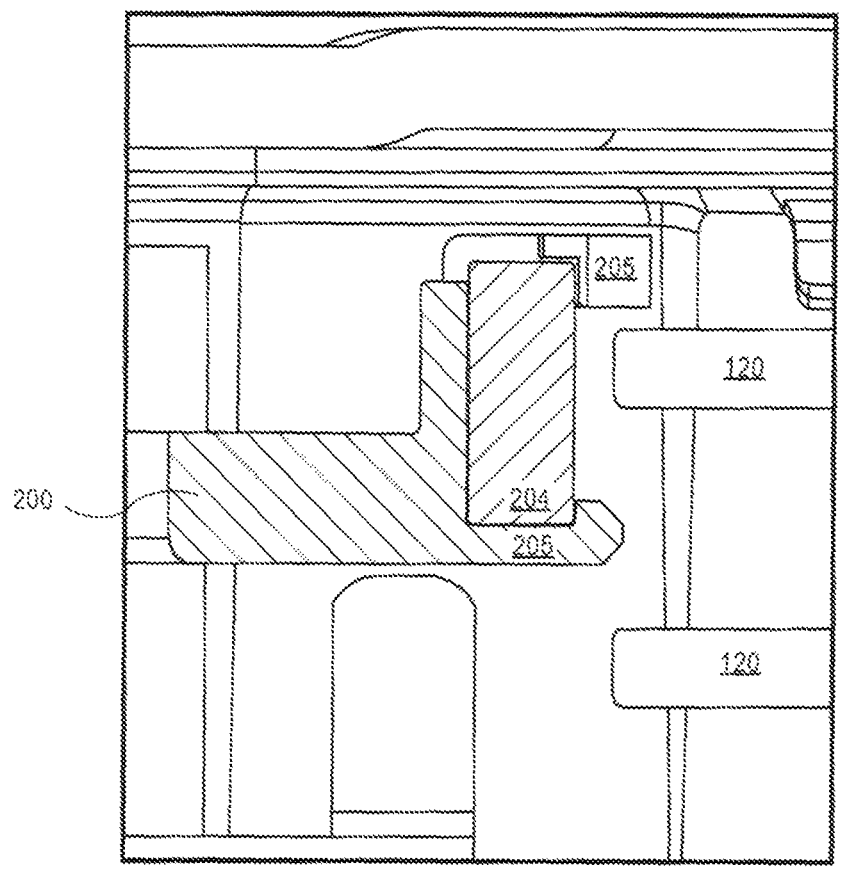
FIG. 5 is a cross-sectional side view illustrating an eddy current magnet of the latch mechanism in relation to a recording disk, according to an embodiment.

FIG. 5 is a cross-sectional side view illustrating an eddy current magnet of the latch mechanism in relation to a recording disk, according to an embodiment. Note from FIGS. 4A, 4B, 5 that eddy current magnet 204 is disposed adjacent to disk 120, i.e., adjacent to the outer perimeter side face or edge of one or more disk 120. Thus, eddy current magnet 204 is outside of the disk 120 area, i.e., outside of the "footprint" of disk 120. Stated otherwise, eddy current magnet 204 is not positioned over or under disk 120, but rather to the side of disk 120. Consequently, the height of the disk stack and, likewise, the overall height of the HDD can be lower than with an eddy current latch mechanism in which an eddy current magnet is positioned over and/or under the disk surface, i.e., between the disks if there are multiple disks. FIG. 5 shows that the distance between the eddy current magnet 204 and the disk 120 can be minimized by using space over/under disk 120, or between more than one disk 120, for the magnet support 205.

Furthermore, although FIGS. 4A, 4B, 5 depict eddy current magnet 204 of latch mechanism 200 to be positioned proximal to a single disk 120, embodiments are not limited as such. Therefore, according to an embodiment, eddy current magnet 204 may be positioned proximal to the outer perimeter side face of a plurality of disks such as disk 120.

Eddy currents are induced within an electrical conductor by a changing magnetic field experienced by the conductor. An eddy current generates a magnetic field that opposes the magnetic field that generated it and, therefore, reacts back on the magnetic field source. Because eddy current magnet 204 is positioned adjacent the side face of disk 120, and because disk 120 is conductive, when disk 120 is spinning the eddy current magnet 204 and the conductive disk 120 cooperate to generate an eddy current force. In the embodiment in which eddy current magnet 204 is positioned proximal to the outer perimeter side face of a plurality of disks, and even stronger eddy current force is generated by the interaction between eddy current magnet 204 and conductive disk 120. The operation of such eddy current forces in the context of opening and closing latch mechanism 200 is explained in more detail elsewhere herein.

Operation of the Eddy Current Voice Coil Actuator Latch Mechanism

Figure 6:
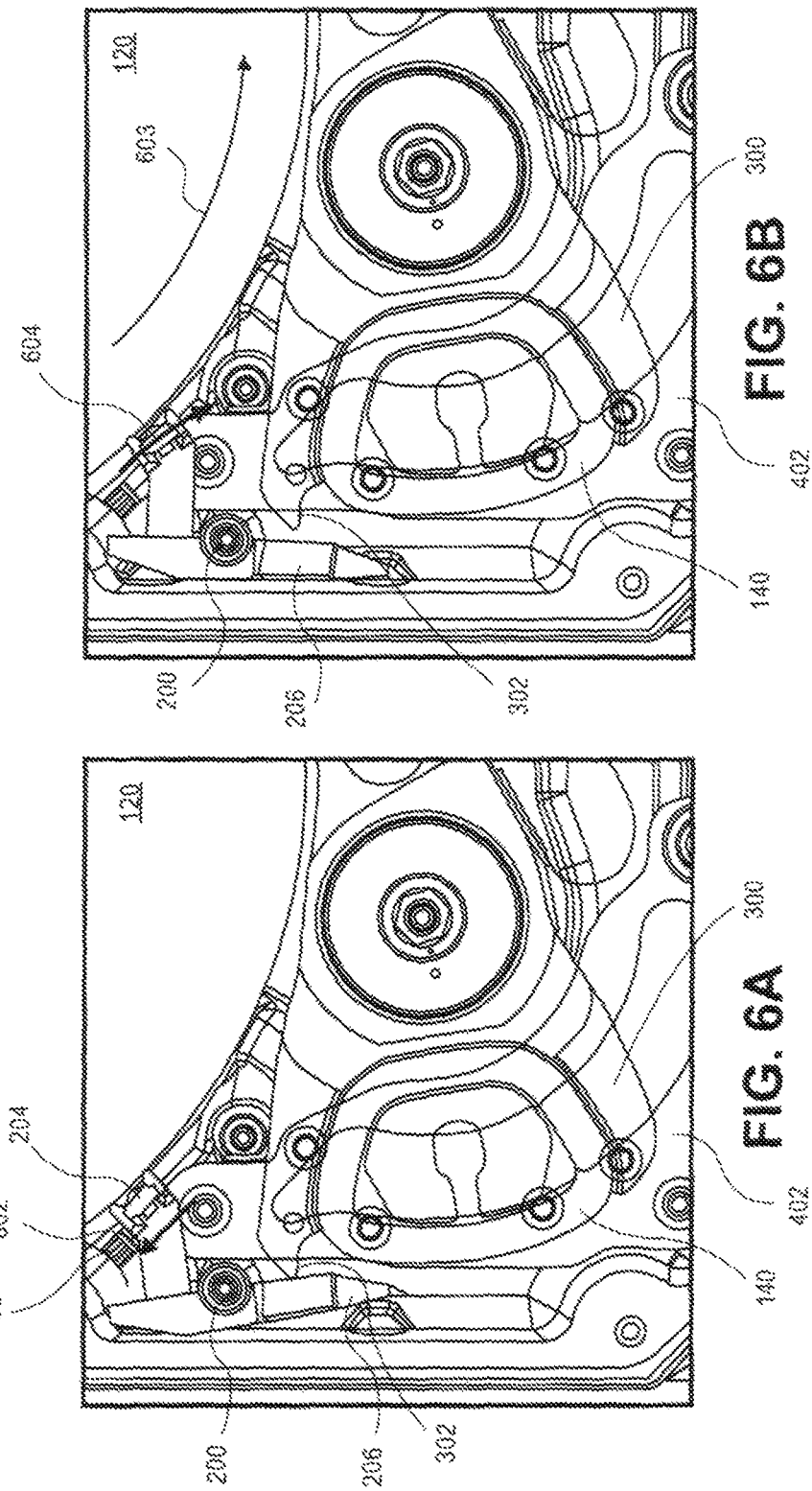
FIG. 6A is a top view illustrating a latch mechanism in a latched position, according to an embodiment.
FIG. 6B is a top view illustrating a latch mechanism in an unlatched position, according to an embodiment.

FIG. 6A is a top view illustrating a latch mechanism in a latched position, and

FIG. 6B is a top view illustrating a latch mechanism in an unlatched position, both according to embodiments.

As discussed, yoke 402 may comprise a magnetic protrusion 403. Thus, according to an embodiment, when the spindle 124 (FIG. 1) is not operating and thus the disk 120 is not spinning/rotating, the latch mechanism 200 moves to a latched/closed position in response to an attracting force between eddy current magnet 204 and magnetic protrusion 403 of voice coil actuator yoke 402, as depicted in FIG. 6A by attracting force 602. In the latched/closed position, the HSA engagement portion 206 of latch mechanism 200 engages with HSA hook 302, thereby holding HSA 300 in place by securing it from rotation such as due to shock and/or vibration for example.

As discussed, eddy currents are induced within an electrical conductor by a changing magnetic field experienced by the conductor. Now with reference to FIG. 6B, as spinning conductive disk 120 moves in the direction 603 (e.g., counterclockwise) through the magnetic field associated with the eddy current magnet 204, an eddy current is generated in disk 120. An eddy current generates a magnetic field that opposes the magnetic field that generated it and, therefore, reacts back on the magnetic field source. Thus, the eddy current generated by the cooperation of eddy current magnet 204 and spinning disk 120 generates a corresponding magnetic field that manifests as an electromagnetic force acting back on the eddy current magnet 204, as depicted by eddy current force 604. Consequently, the spinning disk 120 exerts a "drag" force on eddy current magnet 204, essentially dragging the eddy current magnet 204 along generally in the direction of rotation of the spinning disk 120. This eddy current force 604 acting upon eddy current magnet 204 causes the latch mechanism 200 to rotate (e.g., clockwise) about its rotation axis 203. This rotation moves latch mechanism 200 to an unlatched/open position, as the HSA engagement portion 206 of latch mechanism 200 disengages from HSA hook 302 under the influence of the eddy current force 604, thereby allowing HSA 300 to be driven by signals to the voice coil 140 of the VCM, e.g., allowing HSA 300 moved from the load/unload ramp and loaded onto disk 120.

Eddy Current Latch Mechanism with Biasing Cam

Figure 7:
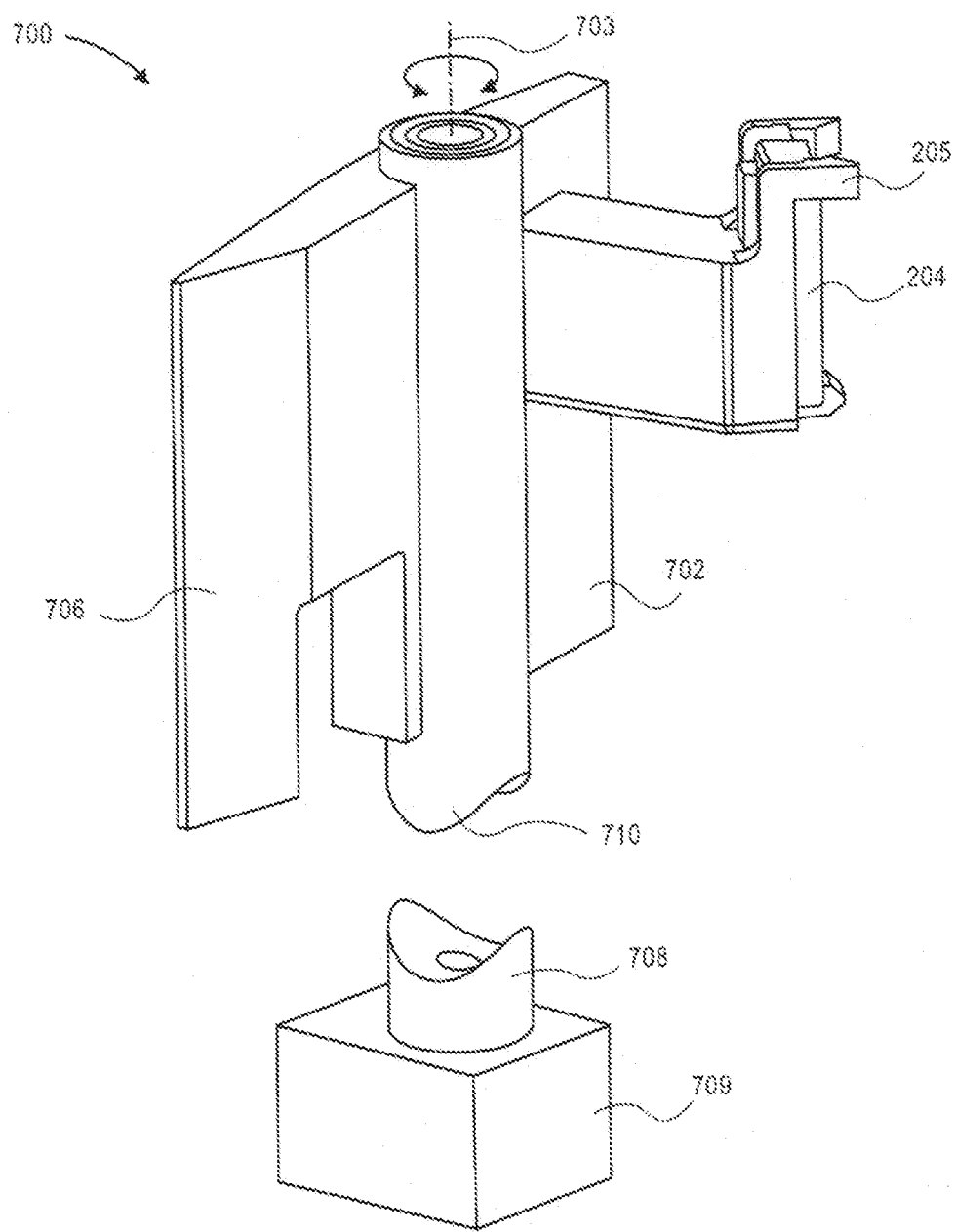
FIG. 7 is an exploded perspective view illustrating a latch mechanism, according to an embodiment.

FIG. 7 is an exploded perspective view illustrating a latch mechanism, according to an embodiment. Latch mechanism 700 comprises a latch lever 702 that is configured for rotatably mounting of latch mechanism 700 on a base 709, and is rotatable about rotation axis 703. A pin or similar mechanism may be used to rotatably mount latch lever 702 onto base 709. Base 709 of latch mechanism 700 comprises an end cam 708, and latch lever 702 comprises a cam follower 710 part that is capable of rotatably engaging with end cam 708.

Latch mechanism 700 further comprises an eddy current magnet 204 vertically mounted in a magnet support 205. As described in reference to FIG. 2, the eddy current magnet 204 is mounted vertically in that its major axis is in the y-direction, which coincides with the direction of the rotation axis 703. The eddy current magnet 204 illustrated in FIG. 7 is depicted as rectangular in shape but embodiments are not so limited. Thus, when eddy current magnet 204 is positioned proximal to one or more recording disk (e.g., disk 120 of FIG. 1), the eddy current magnet 204 is positioned proximal to the outer perimeter side face of the one or more disk, the importance of which is explained in more detail elsewhere herein.

Latch lever 702 includes an HSA engagement portion 706 that is configured to engage with a corresponding HSA when installed in an HDD, generally at times when the HDD is not operating, i.e., when read or write operations are not being performed. With reference to FIG. 3, HSA 300 comprises a hook 302 that is configured to engage with a corresponding HSA engagement portion 706 of latch lever 702 of latch mechanism 700. Thus, FIG. 7 and FIG. 3 show how the latch mechanism 700 would engage with the HSA 300 in a "latched" or closed position when installed together in an HDD, i.e., when the HSA 300 is restrained from rotating, or "secured".

Operation of the Eddy Current Latch Mechanism with Biasing Cam

Figure 8:
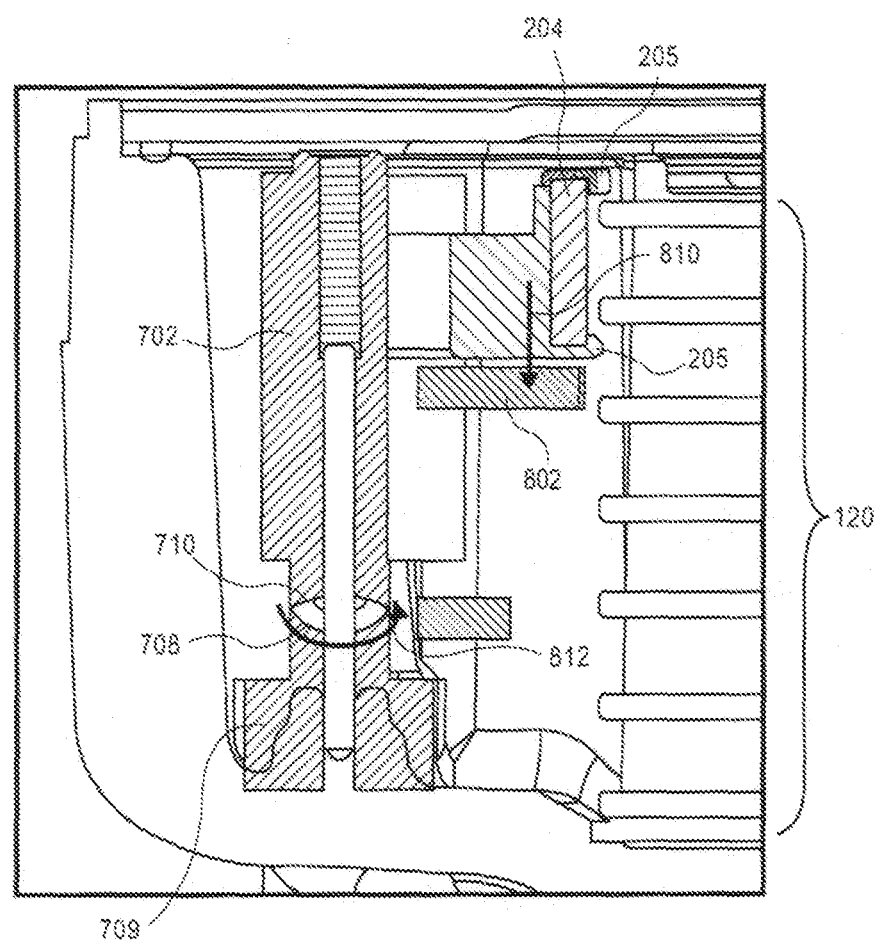
FIG. 8 is a cutaway side view illustrating a latch mechanism in latched operation, according to an embodiment.

FIG. 8 is a cutaway side view illustrating a latch mechanism in latched operation, according to an embodiment. According to an embodiment, eddy current magnet 204 is positioned above a voice coil actuator yoke 802. Therefore, there is an attracting force between the eddy current magnet 204 and the magnetic yoke 802 in a vertical direction, as depicted by attractive force 810. The end cam 708/cam follower 710 mechanism is configured such that the vertical attractive force 810 between eddy current magnet 204 and yoke 802 is essentially converted to a rotational biasing force 812 in the latch rotation direction, which causes the end cam 708 and the cam follower 710 to engage and to thus hold the latch lever 702 in the latched/closed position (see, e.g., FIG. 9B).

Figure 9A:
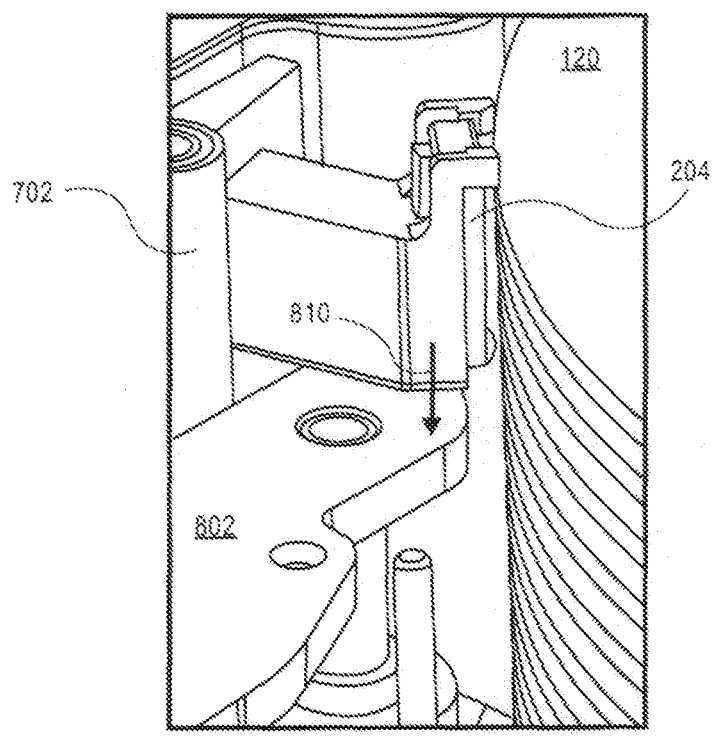
FIG. 9A is a perspective view illustrating a latch mechanism in a latched position, according to an embodiment.
Figure 9C:
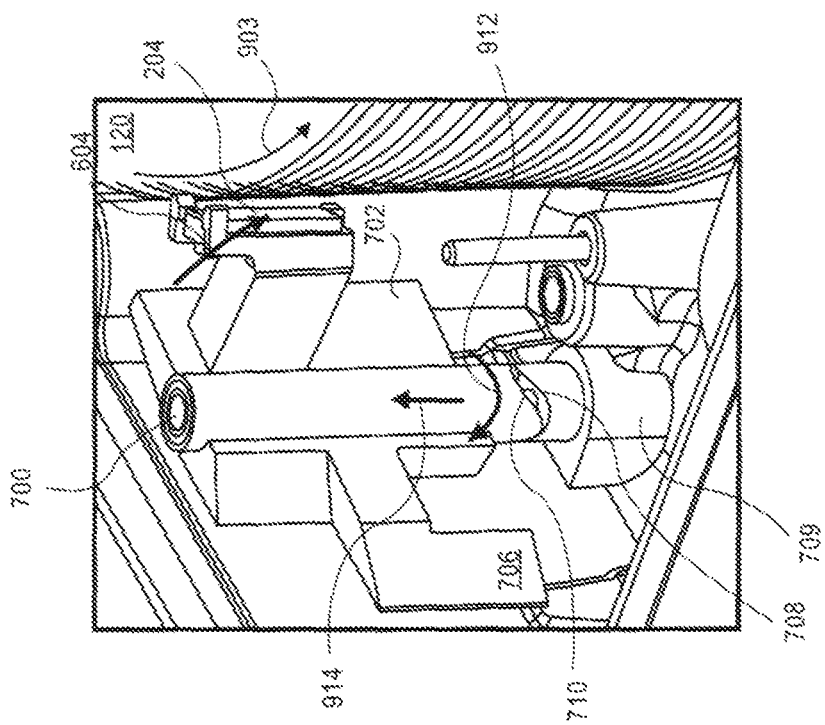
FIG. 9C is a perspective view illustrating a latch mechanism in unlatched operation, according to an embodiment.
Figure 9B:
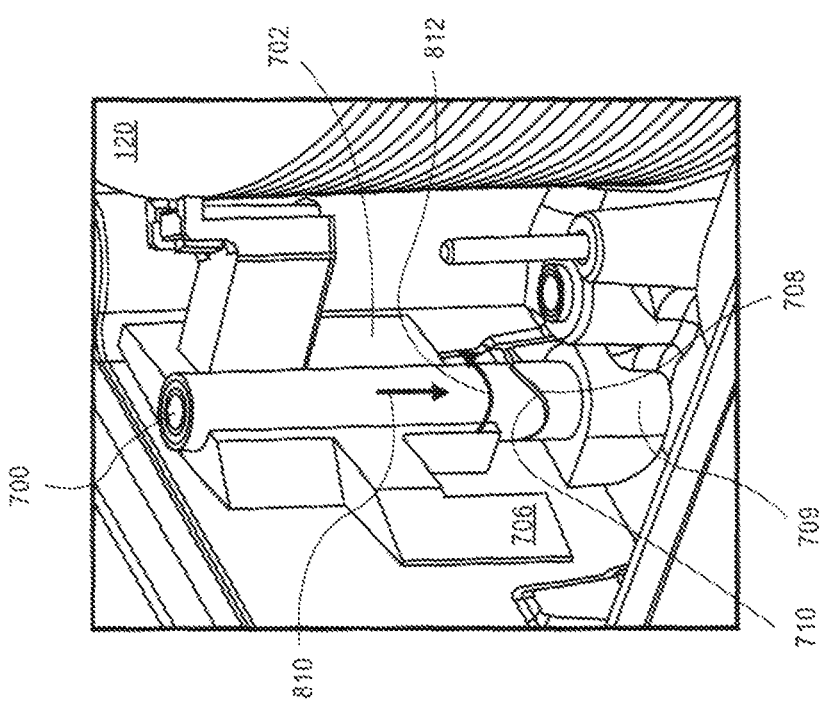
FIG. 9B is a perspective view illustrating a latch mechanism in a latched position, according to an embodiment.

FIG. 9A is a perspective view illustrating a latch mechanism in a latched position, and FIG. 9B is a perspective view illustrating a latch mechanism in a latched position, both according to an embodiment. According to an embodiment, when the spindle 124 (FIG. 1) is not operating and thus the disk 120 is not spinning/rotating, the latch mechanism 700 moves to a latched/closed position in response to an attracting force between eddy current magnet 204 and magnetic voice coil actuator yoke 802, as depicted in FIG. 9A by attracting force 810. In the latched/closed position, the HSA engagement portion 706 of latch mechanism 700 engages with HSA hook 302 (FIG. 3), thereby holding HSA 300 in place by securing it from rotation such as due to shock and/or vibration for example. As depicted in FIG. 9B, the end cam 708 of base 709 and the cam follower 710 of latch lever 702 are engaged, or interposed, with one another due to their mechanically mating configuration and as biased, encouraged or induced by the action of rotational biasing force 812.

FIG. 9C is a perspective view illustrating a latch mechanism in unlatched operation, according to an embodiment. As discussed, eddy currents are induced within an electrical conductor by a changing magnetic field experienced by the conductor. Now with reference to FIG. 9C, as one or more spinning conductive disk 120 moves in the direction 903 (e.g., counterclockwise) through the magnetic field associated with the eddy current magnet 204, an eddy current is generated in the one or more disk 120. An eddy current generates a magnetic field that opposes the magnetic field that generated it and, therefore, reacts back on the magnetic field source. Thus, the eddy current generated by the cooperation of eddy current magnet 204 and spinning disk 120 generates a corresponding magnetic field that manifests as an electromagnetic force acting back on the eddy current magnet 204, as depicted by eddy current force 604. Consequently, the spinning disk 120 exerts a "drag" force on eddy current magnet 204, essentially dragging the eddy current magnet 204 along generally in the direction of rotation of the spinning disk 120. This eddy current force 604 acting upon eddy current magnet 204 causes the latch mechanism 700 to rotate (e.g., clockwise) about its rotation axis 703 (FIG. 7), depicted as clockwise rotation 912. In light of the configuration of end cam 708/cam follower 710, the rotational force of rotation 912 allows for the latch lever 702 to rise along its axis while disengaging cam follower 710 from end cam 708, depicted as upward movement 914. This rotation 912 and upward movement 914 moves latch mechanism 700 to an unlatched/open position, as the HSA engagement portion 706 of latch mechanism 700 disengages from HSA hook 302 (FIG. 3) under the influence of the eddy current force 604, thereby allowing HSA 300 to be driven by signals to the voice coil 140 of the VCM, e.g., allowing HSA 300 moved from the load/unload ramp and loaded onto disk 120.

Operating a Voice Coil Actuator Latch Mechanism in a Hard Disk Drive

FIG. 10 is a flow diagram illustrating a method for operating a voice coil actuator latch system in a hard disk drive, according to an embodiment.

At block 1002, rotate on or more recording disk media, causing an eddy current magnet positioned proximal to the outer perimeter side face of the disk media to cooperate with the side face of the disk media in generating an eddy current force that rotates a latch lever of a voice coil actuator latch mechanism to an unlatched position. Unlatching the latch mechanism allows the voice coil actuator to move the head slider off the secured area (e.g., a load/unload ramp or area of disk) in order to access portions of the disk media.

For example, positioning eddy current magnet 204 proximal to the outer perimeter side face of one or more disk media 120 (see, e.g., FIGS. 4A, 4B, 5, 9A-9C), and rotating/spinning the disk media to cause the eddy current magnet 204 of latch mechanism 200 (FIG. 2) to cooperate with the side face of the disk media 120 to generate an eddy current force (e.g., 604 of FIG. 6B, 9C) that causes rotation of a latch lever 206 of a latch mechanism 200 to an unlatched or open position, disengaged from the HSA hook 302. For example, the eddy current force (e.g., 604 of FIG. 9C) that causes rotation 912 (FIG. 9C) and upward movement 914 (FIG. 9C) of a latch lever 706 of a latch mechanism 700 to an unlatched or open position, disengaged from the HSA hook 302

Block 1004 applies to the latch mechanism 700 (FIG. 7) embodiment, in which the base 709 comprises a cam 708 and the latch lever 702 comprises a cam follower 710. At block 1004, to unlatch the latch mechanism 700, stop rotating the disk media thereby allowing the eddy current magnet to attract to the magnetic yoke of the voice coil actuator positioned below the eddy current magnet, in order to hold the latch lever in a latched/closed position by generating a latch bias force which causes the end cam and the cam follower to rotatably engage.

For example, disk 120 (e.g., FIGS. 8, 9A, 9B) is stopped rotating, thereby allowing eddy current magnet 204 to attract to the magnetic yoke 802 (FIG. 8) causing an attracting force such as attracting force 810 (FIGS. 8, 9A, 9B). Attracting force 810, in conjunction with the end cam 708/cam follower 710 mechanism, generates a latch bias rotational force 812 (FIGS. 8, 9B) which causes end cam 708 of base 709 to engage with cam follower 710 (FIG. 9C) to rotatably engage. In the latched/closed position, the HSA engagement portion 706 of latch mechanism 700 engages with HSA hook 302 (FIG. 3), thereby holding HSA 300 in place by securing it from rotation such as due to shock and/or vibration for example.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A hard disk drive (HDD) comprising:
    one or more recording disk media rotatably mounted on a spindle;
    a head slider comprising a read/write head configured to read from and to write to said one or more disk media;
    a voice coil actuator configured to move said head slider to access portions of said one or more disk media; and
    a voice coil actuator latch mechanism comprising:
        a latch lever rotatably disposed on a base, and
        an eddy current magnet positioned proximal to the outer perimeter side face of said one or more disk media and which, when said one or more disk media spins, cooperates with said outer perimeter side face of said disk media in generating an eddy current force to rotate said latch lever to an unlatched position.

2. The HDD of claim 1, wherein said eddy current magnet is mounted in mechanical connection with said latch lever.

3. The HDD of claim 1, wherein said eddy current magnet is mounted substantially perpendicular to and not parallel to an upper surface and a lower surface of said one or more disk media.

4. The HDD of claim 1, wherein said eddy current magnet is positioned proximal to a plurality of said one or more disk media and which, when said plurality of disk media spin, cooperates with said plurality of disk media in generating said eddy current force to rotate said latch lever to said unlatched position.

5. The HDD of claim 1, wherein said eddy current magnet, when said one or more disk media are stationary, attracts to a magnetic protrusion of a yoke of said voice coil actuator to hold said latch lever in a latched position.

6. The HDD of claim 1,
    wherein said base comprises an end cam;
    wherein said latch lever comprises a cam follower capable of rotatably engaging with said end cam;
    wherein said eddy current magnet is positioned above a magnetic yoke of said voice coil actuator and attracts to said yoke to generate a latch bias force which causes said end cam and said cam follower to engage and hold said latch lever in a latched position.

7. A voice coil actuator latch mechanism comprising:
    a latch lever rotatably disposed on a base; and
    an eddy current magnet mounted in mechanical connection with said latch lever and which, when positioned proximal to the outer perimeter side face of one or more spinning magnetic-recording disks, cooperates with said outer perimeter side face of said one or more disks in generating an eddy current force to rotate said latch lever to an unlatched position.

8. The voice coil actuator latch mechanism of claim 7, wherein said eddy current magnet, when positioned proximal to a plurality of spinning magnetic-recording disks, cooperates with said plurality of disks in generating said eddy current force to rotate said latch lever to said unlatched position.

9. The voice coil actuator latch mechanism of claim 7, wherein said eddy current magnet, when positioned proximal to one or more stationary magnetic-recording disks, attracts to a magnetic protrusion of a yoke of said voice coil actuator to hold said latch lever in a latched position.

10. The voice coil actuator latch mechanism of claim 7,
wherein said latch lever comprises a cam follower capable of rotatably engaging with and end cam of said base;
wherein said eddy current magnet, when positioned above a magnetic yoke of said voice coil actuator, attracts to said yoke to generate a latch bias force which causes said end cam and said cam follower to engage and hold said latch lever in a latched position.

11. A method for operating a voice coil actuator latch mechanism in a hard disk drive, the method comprising:
rotating one or more recording disk media rotatably mounted on a spindle, causing an eddy current magnet positioned proximal to the outer perimeter side face of said one or more disk media to cooperate with said outer perimeter side face of said disk media in generating an eddy current force that rotates a latch lever of said latch mechanism to an unlatched position to allow said voice coil actuator to move a head slider to access portions of said one or more disk media.

12. The method of claim 11, wherein said causing includes causing said eddy current magnet positioned proximal to a plurality of said one or more disk media to cooperate with said plurality of disk media in generating said eddy current force to rotate said latch lever to said unlatched position.

13. The method of claim 11, wherein said causing includes causing said eddy current magnet mounted substantially perpendicular to and not parallel to an upper surface and a lower surface of said one or more disk media to cooperate with said plurality of disk media in generating said eddy current force to rotate said latch lever to said unlatched position.

14. The method of claim 11, further comprising:
stopping rotating said one or more recording disk media, causing said eddy current magnet to attract to a magnetic protrusion of a yoke of said voice coil actuator to hold said latch lever in a latched position.

15. The method of claim 11,
stopping rotating said one or more recording disk media, allowing said eddy current magnet to attract to a magnetic yoke of said voice coil actuator positioned below said eddy current magnet, to hold said latch lever in a closed position by generating a latch bias force which causes an end cam of a base and a cam follower of said latch lever to rotatably engage.

* * * * *

UNITED STATES PATENT AND TRADEMARK OFFICE
CERTIFICATE OF CORRECTION

PATENT NO.         : 9,177,578 B1
APPLICATION NO.    : 14/622804
DATED              : November 3, 2015
INVENTOR(S)        : Takayama et al.

Page 1 of 1

It is certified that error appears in the above-identified patent and that said Letters Patent is hereby corrected as shown below:

In the claims

Column 12, line 13, replace the text "plurality of disk media" with "one or more disk media".

Signed and Sealed this
Sixteenth Day of February, 2016

Michelle K. Lee
*Director of the United States Patent and Trademark Office*